United States Patent [19]

Durrieu

[11] Patent Number: 5,017,294

[45] Date of Patent: May 21, 1991

[54] APPARATUS FOR THE SEPARATION OF TWO IMMISCIBLE LIQUIDS AND USE OF SAID APPARATUS IN THE DESALTING OF A HYDROCARBON FEEDSTOCK

[75] Inventor: Marc Durrieu, Sainte Adresse, France

[73] Assignee: Compagnie de Raffinage et de Distribution Total France, Levallois-Perret, France

[21] Appl. No.: 499,036

[22] Filed: Mar. 26, 1990

[30] Foreign Application Priority Data

Mar. 24, 1989 [FR] France .................... 89 03921

[51] Int. Cl.$^5$ .......................... B01D 17/022
[52] U.S. Cl. ..................... 210/708; 210/799; 210/253; 210/323.2; 210/DIG. 5
[58] Field of Search ........... 210/708, 799, 804, 253, 210/259, 306, 323.2, 446, 521, DIG. 5

[56] References Cited

U.S. PATENT DOCUMENTS

| | | |
|---|---|---|
| 3,794,583 | 2/1974 | Rhodes . |
| 4,391,716 | 7/1983 | McCurry . |
| 4,650,581 | 3/1987 | Anzles et al. ............ 210/DIG. 5 |

FOREIGN PATENT DOCUMENTS

| | | |
|---|---|---|
| 0004724 | 10/1979 | European Pat. Off. . |
| 0207797 | 1/1987 | European Pat. Off. . |
| 79614 | 2/1894 | Fed. Rep. of Germany . |
| 18491 | 8/1950 | Fed. Rep. of Germany . |
| 2148978 | 5/1972 | Fed. Rep. of Germany . |
| 3122289 | 5/1982 | Fed. Rep. of Germany . |
| 3103723 | 9/1982 | Fed. Rep. of Germany . |
| 3239813 | 5/1983 | Fed. Rep. of Germany . |
| 2598429 | 11/1987 | France . |

Primary Examiner—Stanley Silverman
Assistant Examiner—Christopher Upton
Attorney, Agent, or Firm—A. Thomas S. Safford

[57] ABSTRACT

The invention relates to an apparatus for promoting the separation and/or contact of two immiscible liquids, said apparatus comprising at least one pipe for feeding an emulsion of the two liquids to an assembly of tubes in each of which there is disposed, in the direction of its length and over at least a portion thereof, a bundle of fibers which are preferentially wettable by one of the two liquids, said assembly being connected to a decanter in which the two liquids separate, the decanter being provided with pipes for the discharge of each of the two liquids.

The tubes are bounded by two walls, separated by a substantially constant distance, and by a corrugated element inserted between said walls and alternately in contact with each of them through its corrugations.

7 Claims, 5 Drawing Sheets

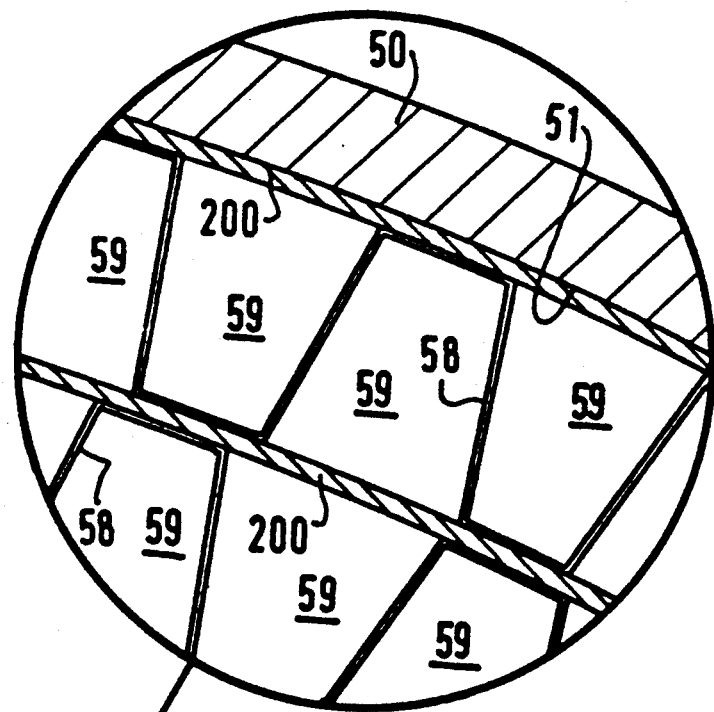
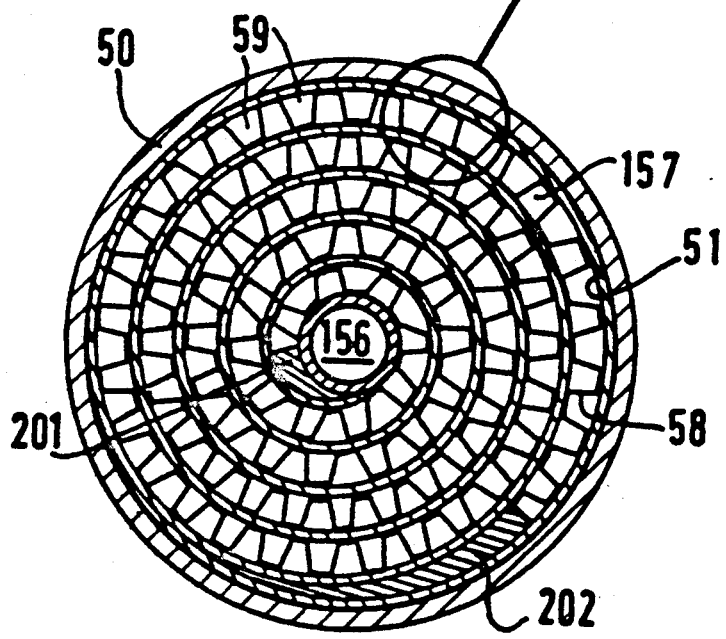
FIG. 5A
FIG. 5

APPARATUS FOR THE SEPARATION OF TWO IMMISCIBLE LIQUIDS AND USE OF SAID APPARATUS IN THE DESALTING OF A HYDROCARBON FEEDSTOCK

The present invention relates to a process and an apparatus for promoting the separation and/or contact of two liquids. It relates, more particularly, to the separation of the water contained in crude petroleum and/or to the contact between the water and the crude petroleum, and especially to the desalting of a hydrocarbon feedstock.

It is this use that will be referred to in detail further on. However, the process and apparatus which are the subject of the invention obviously lend themselves also to the separation of pairs of immiscible liquids other than the pair water/crude petroleum.

At the head of a producing well, crude petroleum is in admixture with a more or less sizable quantity of water containing salts in solution (sodium, magnesium and calcium chlorides), which is subjected to a first separation in the producing field itself. However, the petroleum which goes to the refineries still contains a certain volume of salt water, which should be eliminated before any further treatment. This operation is generally performed by injecting water into the crude and emulsifying this mixture to form an aqueous phase that is dispersed in the hydrocarbon phase in the form of tiny droplets. This aqueous phase collects the residual salt water initially present in the crude petroleum. When the aqueous phase is then separated from the hydrocarbon phase by breaking the emulsion formed, possibly after adding a demulsifier, in an appropriate apparatus such as an electrostatic desalter, to bring about the coalescence of the water droplets, a crude petroleum is recovered which contains only a small portion of the water and the salts.

The efficiency of the desalting operation depends on the quality of the "washing" of the crude petroleum, and hence on the contact surface between the water and hydrocarbon phases. That surface is the larger the smaller the water drops are, which, however, then complicates the coalescing of the water drops necessary for the separation of the two phases since an emulsion of very small drops is often stable and therefore difficult to break.

In practice, the desalting efficiency DE achieved by such processes is calculated through the ratio $$DE = \frac{[Salts] \text{ at inlet} - [Salts] \text{ at outlet}}{[Salts] \text{ at inlet}} \times 100$$

where [Salts] is the concentration of salts in the hydrocarbon upstream and downstream, respectively, of the desalting operations.

DE is generally on the order of from 70 to 90 percent for a properly functioning desalter. Now the presence of residual sodium, magnesium and calcium chlorides in the crude petroleum so treated will entail considerable increases in the cost of the subsequent operations performed on this crude, such as additional catalyst consumption in catalytic cracking and excessive coke formation in visbreaking.

From the French patent application filed on May 7, 1986, in the name of the Assignee and published on Nov. 13, 1987, under No. 2,598,429, a process and an apparatus permitting the separation of water and crude petroleum to be improved by passing the mixture through a bundle of fibers disposed inside a tube are known.

According to that patent application, a plurality of tubes may be used, depending on the flow rate of the water/crude petroleum mixture.

The Applicant has now found that this array of tubes can be assembled in a simple manner by employing the technique used to build heat exchangers such as those described in French design patent 2,515,328. In such heat exchangers, the chambers in which the fluids circulate are separated by a sandwich-type assembly formed of three superimposed strips of sheet metal, namely, two flat sheets between which a corrugated sheet is placed whose corrugations extend transversely.

The present invention thus seeks as one embodiment to propose an apparatus for the separation of two immiscible liquids forming the two phases of an emulsion and, more particularly, for the treatment of an emulsion of water in crude petroleum which permits much more effective desalting of the crude, that is, removal of as much as or more than 95 percent of its initial salt content.

The invention further seeks to propose an apparatus of this type that can be used continuously, without appreciably increasing the cost of the usual crude-petroleum desalting processes, by means which are simple and already being used in other technical fields.

The invention thus has as one embodiment an apparatus for promoting the separation and/or contact of two immiscible liquids, said apparatus comprising at least one pipe for feeding an emulsion of the two liquids to an assembly of tubes in each of which there is disposed, in the direction of its length and over at least a portion thereof, a bundle of fibers which are preferentially wettable by one of the two liquids, said assembly being connected to a decanter in which the two liquids separate, the decanter being provided with pipes for the discharge of the two liquids, said apparatus being characterized in that the tubes are bounded by two walls, separated by a substantially constant distance, and by a corrugated element inserted between said walls and alternately in contact with each of them through its corrugations.

A further embodiment of the invention is an apparatus for the desalting of a hydrocarbon feedstock, and particularly crude petroleum, comprising a desalter, at least one pipe for feeding an emulsion of water and of the hydrocarbon feedstock to the desalter, at least one pipe for discharging the salt-water phase separated in the desalter, and at least one pipe for discharging the hydrocarbon phase from the desalter, said apparatus comprising at least one enclosure, disposed in the feed pipe for the emulsion of water and hydrocarbon feedstock, ahead of the desalter, and/or in the discharge pipe for the hydrocarbon phase, ahead of a decanter, and containing an assembly of tubes in each of which there is disposed, in the direction of its length and over at least a portion thereof, a bundle of fibers preferentially wettable by water or by the hydrocarbon feedstock, said apparatus being characterized in that the tubes are bounded by two walls, separated by a substantially constant distance, and by a corrugated element inserted between said walls and alternately in contact with each of them through its corrugations.

Still another embodiment of the invention is a process for the desalting of a hydrocarbon feedstock, characterized in that upstream or downstream of at least one desalter to which an emulsion of water and the hydrocarbon feedstock is fed, the emulsion, or the hydrocarbon phase discharged from the desalter, is treated by means of an apparatus such as described above.

Since the fibers are preferentially wettable by one of the two liquids, the water or the hydrocarbon phase in the case of desalting, the drops of that liquid will coalesce, coat the fibers and run off along the fibers, thus forming a continuous film which increases the likelihood that the residual drops will be collected, but without forming an emulsion of tiny droplets of one of the two liquids inside the other.

In the case of an apparatus for the desalting of crude petroleum, the enclosure containing the tubes provided with a bundle of fibers may be located upstream and/or downstream of the desalter.

When the enclosure is located upstream of the desalter, a transfer of salt to the desalting water thus occurs even before the mixture reaches the desalter, and the separation in the latter of the salt-water and hydrocarbon phases is facilitated since one of the liquids runs off preferentially along the fibers, generally with a speed differing from that of the other liquid because of the difference in their viscosities.

Under the operating conditions of the desalting process, and bearing in mind that the quantity of desalting water is considerably less than the quantity of petroleum, fibers which are preferentially wetted by water can be used.

When the enclosure containing the tubes provided with a bundle of fibers is located upstream of the desalter, the feed pipe may carry a mixture of water and crude petroleum without being equipped with the mixing valve commonly used for the intimate mixing of the water and the crude petroleum. Because of the fibers of the bundle, the contact surface between the water and the crude will be sufficiently large without there being any need for using droplets of a very small diameter, and this will facilitate the separation of the phases.

When said enclosure is located downstream of the desalter, the fibers are preferably wettable preferentially by water so that the droplets of salted water remaining in the hydrocarbon phase at the outlet of the desalter coalesce on the surface of the fibers to form a substantially continuous film. At the downstream end of the fiber bundle, the residual aqueous phase will then actually be separated from the water and can be collected in a separator by decantation.

Depending on the desired effects and on the conditions of the treatment, fibers of polymers such as polyamide, or glass, boron, carbon or stainless-steel fibers, or any other fiber having good hydrophilic properties, can be used. The fiber bundle is fixed inside the tube provided with it in such a way that it occupies substantially its entire cross section. The extent to which the tube is to be filled should be based on the the effect sought to be achieved. It may range from 5 to 80 percent, for example, and preferably ranges from 10 to 50 percent. The diameter of the fibers may also vary and might range from 40 to 400 microns, without this range being limitative. The mixture of liquids circulating through the tube may be at ambient temperature or at a higher temperature.

When used in desalting, temperatures of at least about 50° C. have proved favorable for effective desalting. As will be seen further on, the effectiveness of desalting with the apparatus of the invention may exceed 95 percent and is better than that obtained with the desalter alone under the same treating conditions.

In all cases, the tube or tubes provided with a fiber bundle are preferably disposed vertically or obliquely to facilitate the flow of the liquids by gravity. The pressure drop between the two ends of the tube, generally less than 100 kilopascals, is of little importance.

Various embodiments of the invention are illustrated in the accompanying drawings, which are not limitative, and wherein FIG. 1 is a diagrammatic view of an apparatus according to the invention, with the assembly of tubes with fiber bundles located upstream of a desalter;

FIG. 5 is a fragmentary sectional view of another embodiment of the enclosure containing the tubes, which are located inside a chamber of helical cross section.

Figure 1:
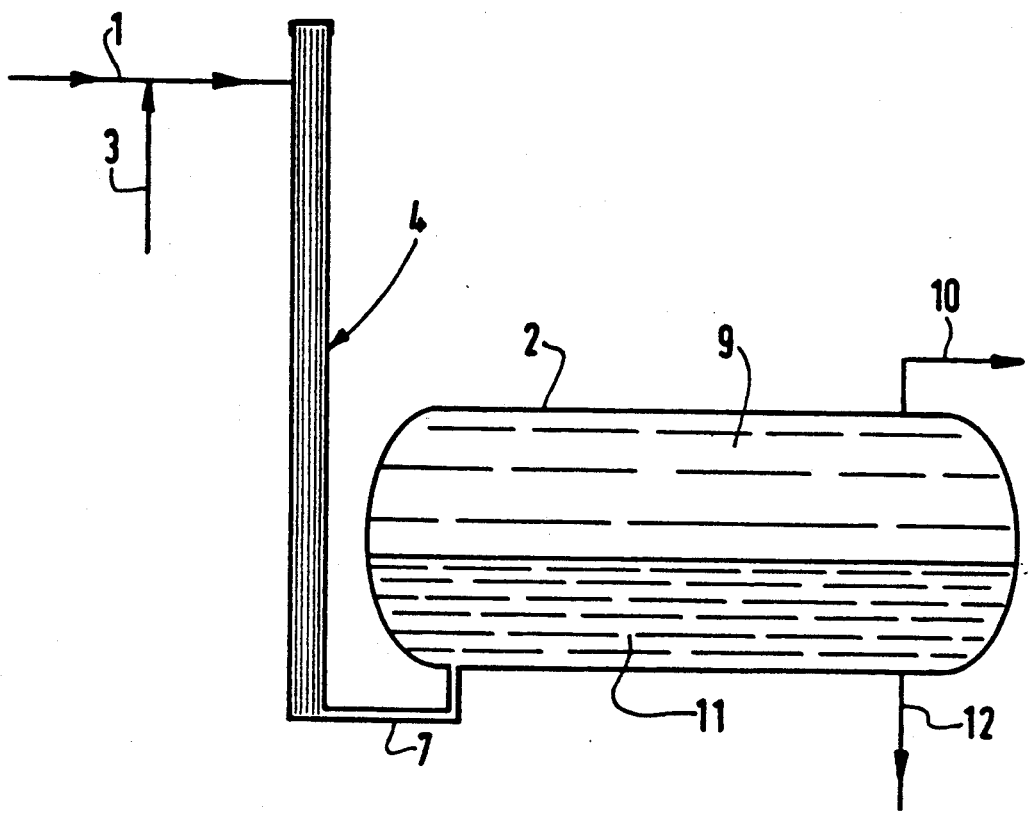

In the embodiment shown in FIG. 1, the crude-petroleum feed line 1 of the electrostatic desalter 2 is supplied with desalting water through the line 3. Downstream of the junction of lines 1 and 3, a mixing valve is usually provided for the intimate mixing of the water and the petroleum in the form of tiny droplets to assure a sizable contact surface between the two phases.

In the present case, that valve is dispensed with and line 1 is connected to the top of a vertical enclosure 4 containing an assembly of tubes, with each tube containing a bundle of fibers, fastened at the upstream end of the tube. The fibers have a preferential affinity for water and are wetted by the drops of water, which thus form a continuous film that flows along the associated fiber. It is apparent that a sizable exchange surface exists, for a given quantity of water, between the water and the crude petroleum over the length of the many fibers, which facilitates and enhances the desalting of the petroleum. At the base of every tube, a partial separation of desalting water and crude petroleum thus occurs, and the mixture obtained can be sent through a line 7 to the base of the desalter 2, where the separation of crude petroleum and water is completed. The desalted crude-petroleum phase 9 can be conventionally discharged from the upper part of the desalter through a line 10 while the water 11 can be discharged from its bottom through the line 12.

Figure 2:
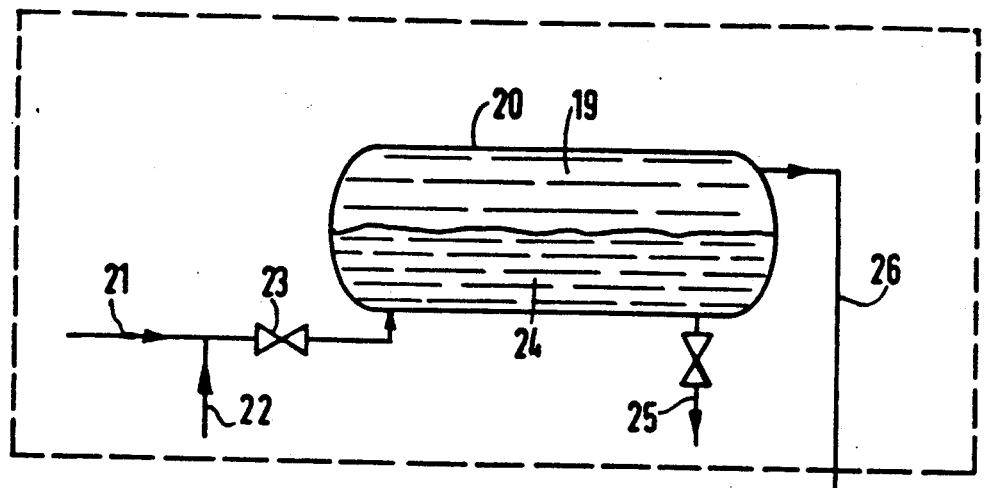
FIG. 2 is a diagrammatic view of an apparatus according to the.invention, with the assembly of tubes with fiber bundles located downstream of a desalter.
Figure 2:
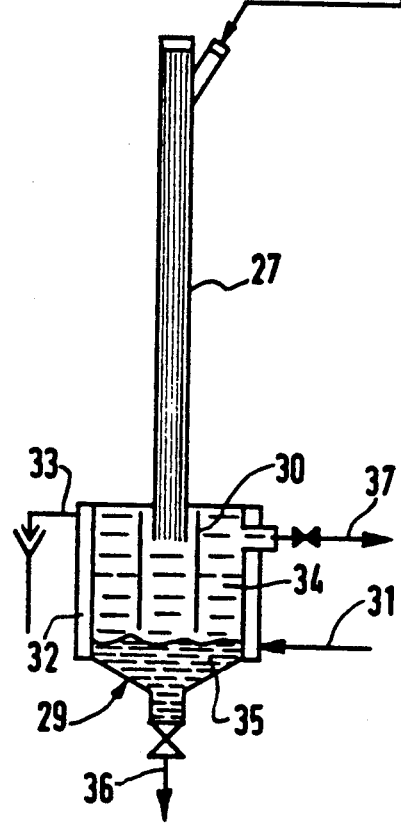

In the embodiment shown in FIG. 2, the desalter 20 is supplied with crude petroleum through the line 21. Desalting water is introduced into line 21 through a line 22, downstream of which a mixing valve 23 is provided in the usual manner. The salt-water phase 24 separated in the desalter is discharged from its bottom through a line 25 while the hydrocarbon phase 19 is discharged from the upper part through a line 26 to a vertical enclosure 27 containing an assembly of tubes, with every tube containing a bundle of fibers.

The enclosure 27 is connected at its downstream end to a decanter 29, with the fiber bundles projecting from the ends of the tubes into a central portion of the desalter that is bounded by a cylindrical partition 30. The decanter 29 is heated by means of hot water, introduced through the line 31 into a jacket 32 and discharged through the line 33.

The fibers of the bundles, which occupy substantially the entire cross section of the tubes, are preferentially wettable by water so that the droplets of salt water remaining in suspension in the hydrocarbon phase 25 separated in the desalter cling to the fibers, coalesce, and form a substantially continuous film, which flows all the way to the decanter 29. The water phase 35 so separated is discharged from the bottom of the decanter through the line 36 while the crude petroleum 34 is recovered in the upper part through the line 37.

Figures 3, 4:
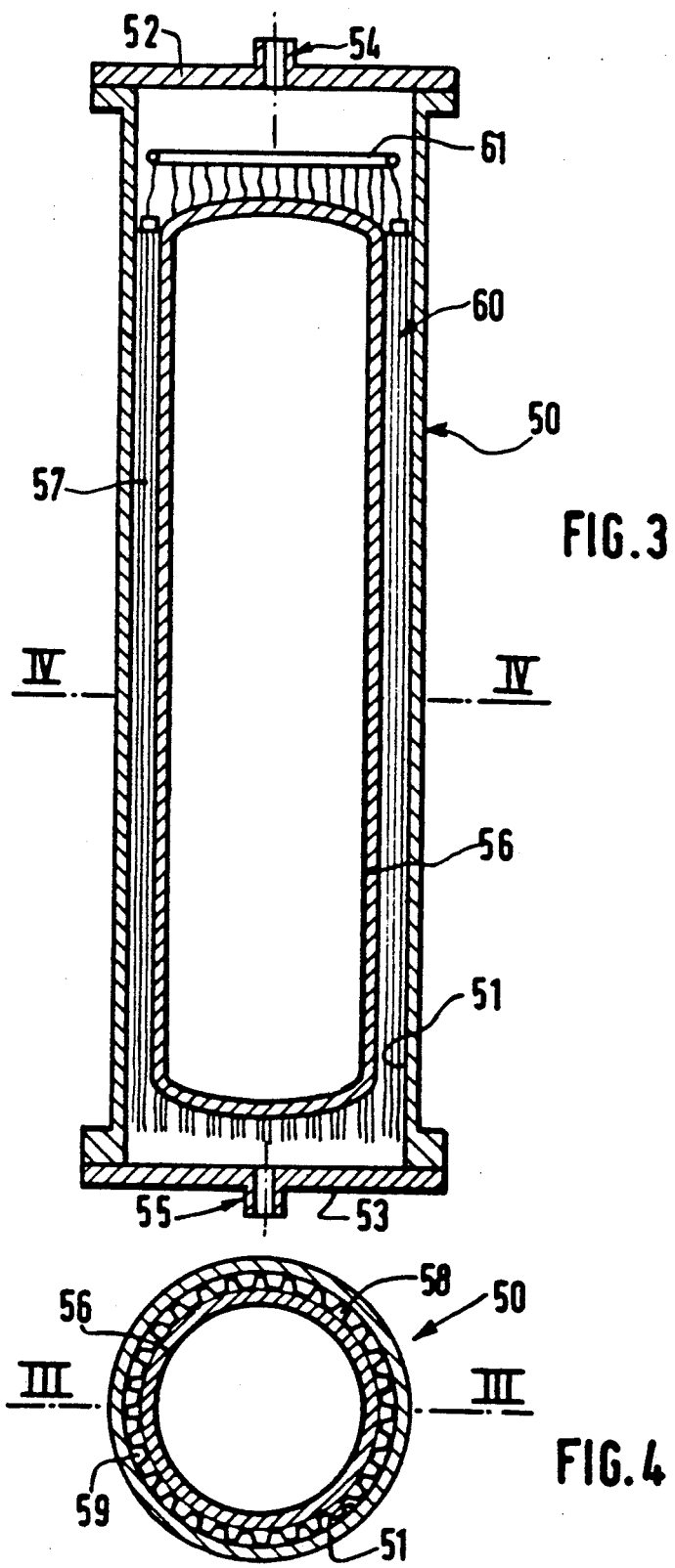
FIG. 3 is a longitudinal section along the line III—III in FIG. 4 of an enclosure containing the tube assembly placed in a chamber of annular cross section.
FIG. 4 is a section along the line IV—IV in FIG. 3.

FIGS. 3 and 4 show an enclosure containing an assembly of tubes which may hold fiber bundles. The tubes are located in a chamber of annular cross section.

In this embodiment, the enclosure 50 is formed by a cylinder 51 equipped with a cover 52 and a bottom 53.

The cover 52 and the bottom 53 are provided with openings 54 and 55 for introducing and drawing off, respectively, the mixture of crude petroleum and water.

The enclosure 50 contains a central cylindrical core 56 whose mounting means are not shown for the sake of simplicity.

The wall 51 of the enclosure 50 and the core 56 form a chamber 57 of annular cross section in which a corrugated sheet of metal 58 is disposed which by its corrugations is alternately in contact with the wall 51 and the core 56 to form with them a plurality of tubes 59. Disposed in each tube is a fiber bundle 60 attached to a fastening system 61 forming a ring.

Figure 6:
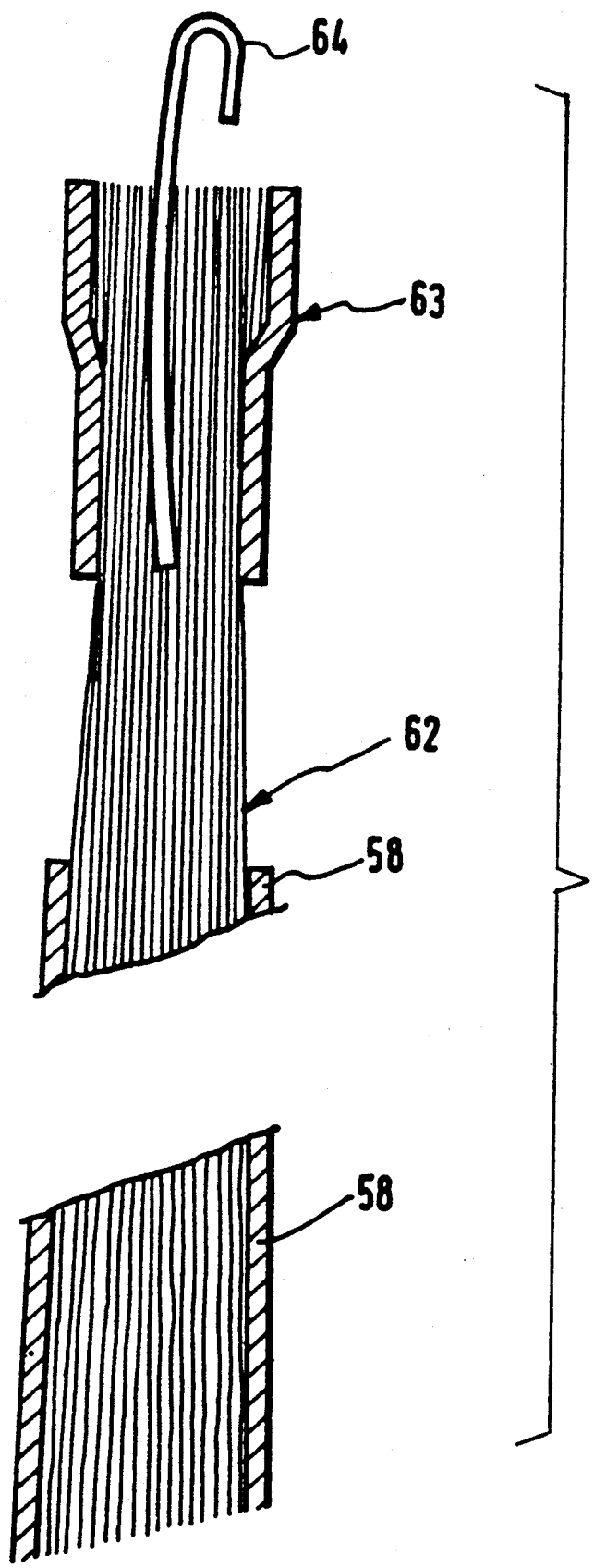
FIG. 6 is a diagrammatic view showing a fiber bundle.

The fibers 62, as shown in FIG. 6, are made of polyamide, for example, and have a length of two meters. There may be 10,000 fibers per bundle, their diameter being $120 \cdot 10^{-4}$ cm. They are set into a collar 63 provided with a hook 64 to permit the bundle to be suspended from the fastening system.

The number of tubes should be based on the feed rate of the crude petroleum to be desalted. If desired, several chambers 57 bounded by concentric walls between which corrugated elements are inserted may be provided.

In an embodiment that is particularly easy to fabricate, a single chamber may be used that is defined by a helical winding of two smooth walls between which a corrugated element is inserted.

FIG. 5 shows an embodiment of the apparatus of the invention that is particularly easy to fabricate and permits tubes 59 to be disposed practically over the entire cross-sectional area of the enclosure 50.

The chamber 157 extends from the core 156 (whose cross section is much smaller than that of the core 56 described in conjunction with FIGS. 3 and 4) to the inside wall 51 of the enclosure 50 as a helically wound smooth sheet of metal 200. The corrugated metal sheet 58 providing the tubes 59 is placed in the chamber 157.

In actual practice, the smooth sheet 200 and the corrugated sheet are wound one on top of the other around the core 156. The reference numerals 201 and 202 denote wedges at the beginning and end, respectively, of the winding with which the cross section of the enclosure 50 is to be filled to prevent the liquid from flowing anywhere but through the tubes 59.

The tubes 59 are filled with fibers gathered into bundles, as shown in FIG. 6. Each hook 64 is in this case attached to a fastening system (not shown) of helical shape.

This specification only refers to the separation of water and crude petroleum in the case of crude-petroleum desalting. However, it will be appreciated that the apparatus of the invention also lends itself to the separation of other water/ hydrocarbon pairs by dehydration, using hydrophilic fibers, or by collecting the hydrocarbons with oleophilic fibers. Other pairs of liquids, such as water and the edible oils, can also be separated.

The example which follows illustrates one mode of carrying out the invention.

EXAMPLE

This example relates to the desalting of different crude petroleums.

Tests A, B, C, D and E were run with an apparatus in accordance with the invention, such as that shown in FIG. 1, and control tests TA, TB, TC, TD and TE with a conventional desalter, such as that shown in FIG. 2, but limited to the dashed rectangle, the enclosure with the tubes containing fibers being dispensed with.

The apparatus of the invention comprises 25 tubes, each provided with a bundle of 10,000 polyamide fibers of a length of two meters and a diameter of $120 \cdot 10^{-4}$ cm. Each tube is filled to the extent of 30 percent.

The results obtained are presented in the table which follows. The respective legends appear at the end of the table.

TABLE

| Test | A | TA | B | TB | C | TC | D | TD | E | TE |
|---|---|---|---|---|---|---|---|---|---|---|
| Crude petroleum | | | | | | | | | | |
| Nature | SF | SF | SF | SF | NF | NF | LA | LA | ME | ME |
| Density at 15° C., kg/cm³ | 826 | 826 | 836 | 836 | 854 | 854 | 863 | 863 | 858 | 858 |
| Water content, ppm (1) | 2980 | 2980 | 3841 | 3841 | 6123 | 6123 | 1900 | 1900 | 5362 | 5362 |
| Salt content (1), ppm | 28 | 28 | 29.5 | 29.5 | 64 | 64 | 16.5 | 16.5 | 42 | 42 |
| Wt. % of water added (2), based on crude petroleum | 5.9 | 5.9 | 5.1 | 5.1 | 6 | 6 | 6.6 | 6.6 | 6.5 | 6.5 |
| Decantation temperature (3), °C. | 140 | 140 | 135 | 135 | 133 | 133 | 139 | 139 | 136 | 136 |
| Analysis after decantation | | | | | | | | | | |
| Water content of crude petroleum (4), ppm | 5540 | 4300 | 5903 | 4550 | 5217 | 5000 | 23010 | 5900 | 30000 | 6400 |
| Salt content of crude petroleum (4), ppm | 1.9 | 2.5 | 2.3 | 3 | 2.8 | 3 | 3.3 | 5 | 6.4 | 16 |
| Hydrocarbon content of aqueous phase (5), ppm | <20 | 80 | <20 | 120 | 150 | 450 | 40 | 150 | 50 | 180 |
| Desalting percentage (6) | 93.2 | 91.1 | 92.2 | 89.8 | 95.6 | 95.3 | 80 | 69.7 | 84.7 | 61.9 |
| Washing | 99.6 | 98.8 | 98 | 98.8 | 100 | 100 | 95.3 | 92.9 | 87.5 | 74.5 |

TABLE-continued

| Test | A | TA | B | TB | C | TC | D | TD | E | TE |
|------|---|----|----|----|----|----|----|----|----|----|
| percentage (7) | | | | | | | | | | |

LEGEND FOR TABLE:
(1) In line 1 (FIG. 1) or 21 (FIG. 2).
(2) Through line 3 (FIG. 1) or 22 (FIG. 2).
(3) In desalter 2 (FIG. 1) or 20 (FIG. 2).
(4) In line 10 (FIG. 1) or 26 (FIG. 2).
(5) In line 12 (FIG. 1) or 25 (FIG. 2).

(6) Desalting percentage = $100 \frac{\text{Salt concentration in crude at inlet}}{\text{Salt concentration in crude at outlet}}$ (7) Washing percentage = $100 \frac{A - B}{A - C}$ with $A = \dfrac{\text{Salt concentration in water contained in crude at inlet}}{\text{Water concentration in crude at inlet}}$ $B = \dfrac{\text{Salt concentration in water contained in crude at outlet}}{\text{Water concentration in crude at outlet}}$ $C = \dfrac{\text{Salt concentration in water contained in crude at inlet}}{\text{Percent total water based on crude}}$ Total water = water in crude at inlet + water added.
SF = Statfjord crude
NF = Nigerian Forcados crude
LA = Light Arabian crude
ME = Mexican crude These results show that desalting is better with the apparatus of the invention than with a conventional apparatus. Moreover, washing, which is indicative of the tendency of the salts to pass into the decantation water, is generally the same and often better.

I claim:

1. An apparatus for promoting the separation, contact, or contact and separation of two immiscible liquids, said apparatus comprising at least one pipe for feeding an emulsion of the two liquids to an assembly of tubes in each of which there is disposed, in the direction of its length and over at least a portion thereof, a bundle of fibers that is preferentially wettable by one of the two liquids, said assembly being connected to a decanter in which the two liquids separate, the decanter being equipped with pipes for the separate respective discharge of each of the two liquids, wherein the assembly of tubes is formed by spaced walls, separated by a substantially constant distance and by a corrugated element inserted between said walls and alternately in contact with each of said walls through its corrugations.

2. An apparatus as defined in claim 1 wherein said spaced walls are formed by a plurality of concentric walls.

3. An apparatus as defined in claim 1 wherein said spaced walls are formed by a single wall of wound into a helix.

4. An apparatus for the desaltimg of a hydrocarbon feedstock, comprising a desalter, at least one pipe for feeding an emulsion of water and the hydrocarbon feedstock to the desalter, at least one pipe for discharging the salt-water phase separated in the desalter, and at least one pipe for discharging the hydrocarbon phase from the desalter, said apparatus comprising at least one enclosure which is disposed in one or both of the feed pipe for the emulsion of water and hydrocarbon feedstock ahead of the desalter or in the discharge pipe for the hydrocarbon phase ahead of a decanter provided with discharge pipes for the water and the hydrocarbon phase, wherein said enclosure contains an assembly of tubes in each of which tube there is disposed, in the direction of its length and over at least a portion thereof, a bundle of fibers which are preferentially wettable by one of water or the hydrocarbon feedstock, wherein the assembly of tubes is formed by spaced walls, separated by a substantially constant distance and by a corrugated element inserted between said walls and alternately in contact with each of said walls through its corrugations.

5. An apparatus as defined in claim 4 wherein said spaced walls are formed by a plurality of concentric walls.

6. An apparatus as defined in claim 4 wherein said spaced walls are formed by a single wall wound into a helix.

7. A process for the desalting of a hydrocarbon feedstock, comprising feeding an emulsion of water and the hydrocarbon feedstock to at least one desalter, and treating at least one of the emulsion or the hydrocarbon feedstock discharged from the desalter by means of an apparatus comprising at least one pipe for feeding an emulsion of the two liquids to an assembly of tubes in each of which there is disposed, in the direction of its length and over at least a portion thereof, a bundle of fibers that is preferentially wettable by one of the two liquids, said assembly being connected to a decanter in which the two liquids separate, the decanter being equipped with pipes for the separate respective discharge of each of the two liquids, wherein the assembly of tubes is formed by spaced walls, separated by a substantially constant distance and by a corrugated element inserted between said walls and alternately in contact with each of said walls through its corrugations.

* * * * *